US008713623B2

(12) United States Patent
Brooks

(10) Patent No.: US 8,713,623 B2
(45) Date of Patent: Apr. 29, 2014

(54) TECHNIQUE FOR EFFECTIVELY PROVIDING PROGRAM MATERIAL IN A CABLE TELEVISION SYSTEM

(75) Inventor: Paul D. Brooks, Highlands Ranch, CO (US)

(73) Assignee: Time Warner Cable Enterprises, LLC, New York, NY (US)

( * ) Notice: Subject to any disclaimer, the term of this patent is extended or adjusted under 35 U.S.C. 154(b) by 2023 days.

(21) Appl. No.: 09/956,688

(22) Filed: Sep. 20, 2001

(65) Prior Publication Data

US 2003/0056217 A1    Mar. 20, 2003

(51) Int. Cl.
H04N 7/173    (2011.01)

(52) U.S. Cl.
USPC ............................ 725/120; 725/93; 725/98

(58) Field of Classification Search
USPC ........................ 725/46, 93, 98, 120
See application file for complete search history.

(56) References Cited

U.S. PATENT DOCUMENTS

| 4,750,213 | A | | 6/1988 | Novak |
| 5,606,359 | A | | 2/1997 | Youden et al. |
| 5,642,151 | A | | 6/1997 | Nusbickel et al. |
| 5,708,961 | A | | 1/1998 | Hylton et al. |
| 5,818,438 | A | | 10/1998 | Howe et al. |
| 5,872,588 | A | * | 2/1999 | Aras et al. ................ 725/14 |
| 5,983,318 | A | | 11/1999 | Willson et al. |
| 6,072,982 | A | * | 6/2000 | Haddad ..................... 725/93 |
| 6,198,478 | B1 | * | 3/2001 | Ota et al. ................. 715/716 |
| 6,510,556 | B1 | * | 1/2003 | Kusaba et al. ............ 725/93 |
| 6,543,053 | B1 | | 4/2003 | Li et al. |
| 6,583,825 | B1 | | 6/2003 | Yuen et al. |
| 6,718,552 | B1 | | 4/2004 | Goode |
| 6,754,271 | B1 | | 6/2004 | Gordon et al. |
| 6,886,029 | B1 | | 4/2005 | Pecus et al. |
| 6,889,382 | B1 | * | 5/2005 | Anderson ................ 725/10 |
| 7,003,790 | B1 | * | 2/2006 | Inoue et al. .............. 725/10 |
| 7,020,893 | B2 | | 3/2006 | Connelly |
| 7,228,555 | B2 | | 6/2007 | Schlack |
| 7,383,564 | B2 | | 6/2008 | White et al. |
| 2002/0002708 | A1 | | 1/2002 | Arye |
| 2002/0056098 | A1 | | 5/2002 | White |
| 2002/0059626 | A1 | * | 5/2002 | Lemmons ................ 725/95 |
| 2002/0138831 | A1 | | 9/2002 | Wachtfogel et al. |
| 2002/0166121 | A1 | * | 11/2002 | Rovira ..................... 725/41 |
| 2003/0037331 | A1 | | 2/2003 | Lee |
| 2003/0156218 | A1 | | 8/2003 | Laksono |
| 2005/0071882 | A1 | | 3/2005 | Rodriguez et al. |

FOREIGN PATENT DOCUMENTS

| EP | 1030305 A3 | 9/2002 |
| EP | 0903941 B1 | 3/2004 |
| WO | 9929108 A1 | 6/1999 |

* cited by examiner

Primary Examiner — John Schnurr
(74) Attorney, Agent, or Firm — Gazdzinski & Associates, PC

(57) ABSTRACT

In a cable television system in accordance with the invention, program materials are made available to subscribers in a neighborhood on an as needed basis. Specifically, when a subscriber at a set-top terminal selects a program channel to watch, the selection request is transmitted to a headend of the system. In response to such a request, a controller in the headend determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood.

49 Claims, 5 Drawing Sheets

300

| X | $N_{PCHX}$ | ASSIGNED CARRIER |
|---|---|---|
| 1 | 0 | NULL |
| 2 | 12 | $C_3$ |
| 3 | 1 | $C_{11}$ |
| ⋮ | ⋮ | ⋮ |
| K | 5 | $C_{25}$ |

304 — X
306 — $N_{PCHX}$
308 — ASSIGNED CARRIER
313 — row 1
311 — row 2

TECHNIQUE FOR EFFECTIVELY PROVIDING PROGRAM MATERIAL IN A CABLE TELEVISION SYSTEM

FIELD OF THE INVENTION

The invention relates to a communications system and method, and more particularly to a community access television (CATV) system and method for providing program material through a network having limited bandwidth.

BACKGROUND OF THE INVENTION

Cable television is typically provided by delivering digital television programming through a community access television (CATV) system to subscribers. Specifically, in delivering the digital television programming, a headend in the CATV system distributes program data streams containing program materials through different channels of a distribution network, which occupy specified frequency bands. The program data stream for each channel is used to modulate a carrier associated with the channel. The resulting modulated carriers are combined and transmitted through the distribution network to a service area node, where the combined modulated carries are provided to a neighborhood. A subscriber in the neighborhood utilizes a set-top terminal to receive the combined modulated carriers and tune to a desired channel to obtain the program material from the associated modulated carrier.

In prior art, the combined modulated carriers provided to a neighborhood contain program materials of all channels used in a CATV system. However, as a cable TV provider uses an increasing number of channels to deliver additional program materials to attain a larger subscription, the number of available channels will soon run out. Thus, an urgent need arises where an efficient utilization of the limited bandwidth of the distribution network is required to deliver the additional program materials.

SUMMARY OF THE INVENTION

I have recognized that use of the distribution network bandwidth in a prior art CATV system is inefficient in that each program channel is fixedly assigned to one of the M carriers for transmission of its program material, where M represents the maximum number of carriers which the limited network bandwidth can accommodate. In addition, all of the program channels are simultaneously made available to each set-top terminal in a neighborhood. As a result, the number of program channels that a prior art CATV system can provide cannot exceed M.

The invention overcomes the prior art limitations by dynamically assigning carriers to carry program materials of only those program channels selected by the set-top terminals (or subscribers) in a neighborhood. Advantageously, the number of program channels that the inventive CATV system can provide, although not simultaneously, can exceed M. In accordance with the invention, a collection of program materials attributed to different program channels carried by assigned carriers are provided to a group of terminals on an as needed basis. When a terminal in the group issues a request for selected program material, a controller determines whether the selected program material has been included in the collection. If it is determined that the selected program material is not included in the collection, the controller causes the newly-selected program material to be added to the collection provided to the group of terminals. To that end, the controller assigns an unused carrier to carry the newly-selected material. A control message responsive to the request is then generated by the controller to the requesting terminal, which contains the identity of the assigned carrier. The requesting terminal may then tune to the identified carrier to obtain the requested program material.

In accordance with an aspect of the invention, any carrier which is assigned to carry program material no longer selected by any terminal in the group is retired and put in reserve for reassignment.

The present disclosure addresses the foregoing needs by providing, in various embodiments, methods and apparatus for effectively providing program material in a cable television system.

In a first aspect of the disclosure, an apparatus for use at a service node of a content delivery network and configured to controllably provide a collection of program materials to a group of terminals serviced thereby is disclosed. The group of terminals are each configured to receive the collection of program materials modulated on a plurality of carriers by the service node. In one embodiment, the apparatus comprises: (i) an interface configured to receive a request for a selected program material from at least one terminal, the request comprising an identification associated with the at least one terminal, (ii) a processing element configured to responsive to the received request determine whether the selected program material is included in the collection of program materials currently being provided to the group of terminals serviced by the service node apparatus, (iii) a first control element, and (iv) a second control element. The first control element is configured to, when it is determined that the selected program material is not included in the collection of program materials: (i) add the selected program material to the collection of program materials currently provided to at least one of the group of terminals by the service node apparatus, and (ii) send a control message to the at least one terminal, the control message including an identification field which includes the identification associated with the at least one terminal, and an indication of a carrier associated with the selected program material. The second control element is configured to, when it is determined that the selected program material is already included in the collection of program materials: (i) send the control message to the at least one terminal, the control message including the identification field which includes the identification associated with the at least one terminal, and the indication of the carrier associated with the selected program material, (ii) when it is deteithined that the selected program material is no longer selected by any of the group of terminals, remove the selected program material from the collection of program materials, and (iii) after a pre-set length of time, automatically remove the selected program material from the collection of program materials.

In a second aspect of the disclosure, a method for use in a content delivery network for controllably providing a collection of program materials to a group of terminals via a processing entity at a service node entity of the network is disclosed. The group of terminals are each configured to receive the collection of program materials modulated on a plurality of carriers by the service node entity. In one embodiment, the method comprises: (i) receiving a request for selected program material from a requesting terminal at the service node entity, (ii) in response to the received request, the service node entity determining whether the selected program material is included in the collection of program materials currently broadcast, (iii) when it is determined that the selected program material is not included in the collection of program materials currently broadcast, the service node entity causing the selected program material to be dynamically added to the collection of program materials currently broadcast to at least one of the group of terminals, and sending a control message to the requesting terminal, the control message configured to identify to the requesting terminal a channel upon which the selected program material will be broadcast, (iv) when it is determined that the selected program material is already included in the collection of program materials that are currently broadcast, sending a control message to the requesting terminal, the control message configured to identify to the requesting terminal the channel upon which the selected program material is already broadcast, and (v) the service node entity automatically causing, at a program boundary, the selected program material to be removed from the collection of program materials currently broadcast via the service node entity.

In a third aspect of the disclosure, a method of operating a service node apparatus in a content delivery network for providing a plurality of programming channels to a group of terminals serviced via the service node apparatus is disclosed. The group of terminals are each configured to receive the plurality of programming channels modulated on a plurality of carriers by the service node apparatus. In one embodiment, the method comprises: (i) receiving at the service node apparatus a request for a selected program channel from the requesting terminal, (ii) responsive to the request, the service node apparatus determining whether the selected program channel is included in the plurality of program channels currently being delivered (iii) causing the selected program channel to be dynamically assigned for delivery via a carrier assigned to carry the selected program channel when the selected program channel is not included in the collection of program channels, (iv) otherwise, when the selected program channel is already included in the plurality of program channels, determining the carrier assigned to carry the selected program channel, (v) transmitting a control message to the requesting terminal, the control message identifying the requesting terminal as an intended recipient of the control message and the carrier assigned to carry the selected program channel, (vi) receiving at the service node apparatus an indication that the requesting terminal is no longer viewing any of the plurality of program channels, (vii) in response to receiving the indication, causing the stream associated with delivery of the selected program channel in the collection of program channels to be reclaimed by causing the selected program channel to be removed from assigned delivery, and (viii) at a program boundary causing the stream associated with delivery of the selected program channel in the collection of program channels to be reclaimed by causing the selected program channel to be removed from assigned delivery.

In a fourth aspect of the disclosure, an apparatus for use at a service node of a content delivery network is disclosed. In one embodiment, the apparatus is configured to controllably provide a collection of program materials to a group of terminals serviced thereby. The group of terminals are configured to receive the collection of program materials modulated on a plurality of carriers by the service node. In one variant, the apparatus comprises: an interface configured to receive a request for a selected program material from at least one terminal, a processing element responsive to the received request configured to determine whether the selected program material is included in the collection of program materials currently being provided to the group of terminals serviced by the service node apparatus, and a control element. The control element is configured to: (i) when it is determined that the selected program material is not included in the collection of program materials: add the selected program material to the collection of program materials currently provided to at least one of the group of terminals by the service node apparatus, and send a control message to the at least one terminal, the control message including an indication of a carrier associated with the selected program material, and (ii) when it is determined that the selected program material is already included in the collection of program materials send the control message to the at least one terminal, the control message including the indication of the carrier associated with the selected program material.

In a fifth aspect of the disclosure, a method for use in a content delivery network for controllably providing a collection of program materials to a group of terminals via a processing entity at a service node entity of the network is disclosed. The group of terminals are each configured to receive the collection of program materials modulated on a plurality of carriers by the service node entity. In one embodiment, the method comprises: (i) receiving a request for selected program material from a requesting terminal at the service node entity, (ii) in response to the received request, the service node entity determining whether or not the selected program material is included in the collection of program materials currently broadcast, (iii) when it is determined that the selected program material is not included in the collection of program materials currently broadcast: the service node entity causing the selected program material to be dynamically added to the collection of program materials currently broadcast to at least one of the group of terminals, and sending a control message to the requesting terminal, the control message configured to identify to the requesting terminal a channel upon which the selected program material will be broadcast; or (iv) when it is determined that the selected program material is already included in the collection of program materials that are currently broadcast sending a control message to the requesting terminal, the control message configured to identify to the requesting terminal the channel upon which the selected program material is already broadcast.

In a sixth aspect of the disclosure, a method of operating a service node apparatus in a content delivery network for providing a plurality of programming channels to a group of terminals serviced via the service node apparatus is disclosed. The group of terminals are configured to receive the plurality of programming channels modulated on a plurality of carriers by the service node apparatus. In one embodiment, the method comprises: (i) receiving at the service node apparatus a request for a selected program channel from the requesting terminal, (ii) responsive to the request, the service node apparatus determining whether the selected program channel is included in the plurality of program channels currently being delivered, (iii) implementing logic, the logic including: (iv) causing the selected program channel to be dynamically assigned for delivery via a carrier assigned to carry the selected program channel when the selected program channel is not included in the collection of program channels, (v) otherwise, when the selected program channel is already included in the plurality of program channels, determining the carrier assigned to carry the selected program channel, and (vi) transmitting a control message to the requesting terminal, the control message identifying the carrier assigned to carry the selected program channel.

Other features and advantages of the present disclosure will immediately be recognized by persons of ordinary skill in the art with reference to the attached drawings and detailed description of exemplary embodiments as given below.

BRIEF DESCRIPTION OF THE DRAWING

Further objects, features and advantages of the invention will become apparent from the following detailed description taken in conjunction with the accompanying drawing, in which.

DETAILED DESCRIPTION

The invention is directed to a technique for utilizing limited network bandwidth to distribute program materials to subscribers in a community access television (CATV) system. In accordance with the invention, the CATV system makes available to subscribers selected program channels, as opposed to all of the program channels furnished by the system as in prior art. In the inventive CATV system, the program channels are provided on an as needed basis, and are selected to serve the subscribers in the same neighborhood requesting those channels.

Figure 1:
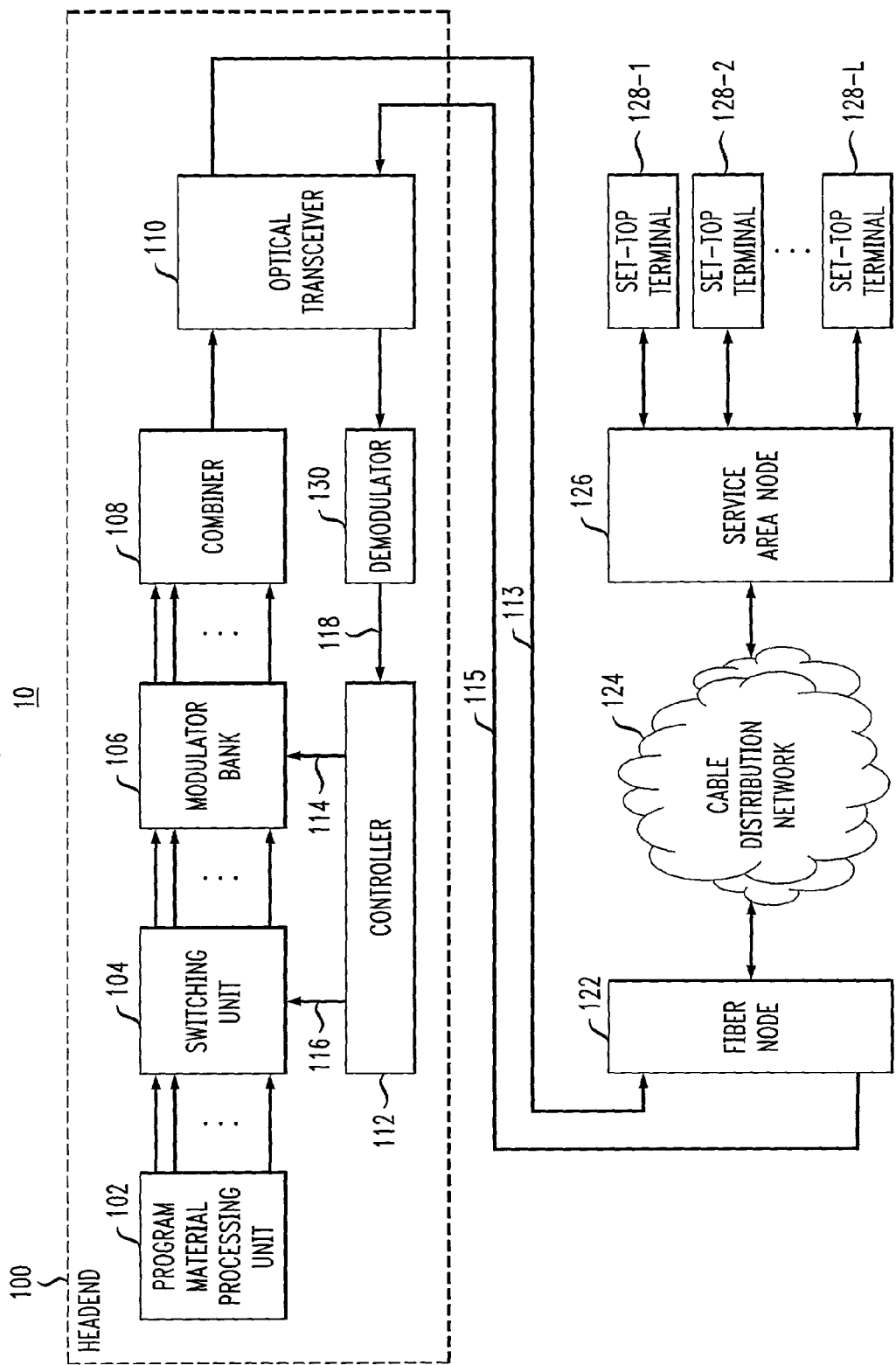
FIG. 1 is a block diagram of a hybrid fiber coax cable CATV system in accordance with the invention.

FIG. 1 illustrates hybrid fiber coax (HFC) cable CATV system 10 embodying the principles of the invention for providing program materials to set-top terminals on the subscriber premises. As shown in FIG. 1, system 10 includes headend 100, fiber node 122, cable distribution network 124, and service area node 126 which is connected to set-top terminals 128-1 through 128-L in a neighborhood, where L is a predetermined number.

In headend 100, program material processing unit 102 receives program materials from various sources via satellites, terrestrial microwave transmissions, cable, etc. The program materials are processed by unit 102 to form K individual program data streams in a digital format, where K is an integer. Each program data stream contains program material, which requires a transmission channel having a specified frequency band for its distribution. In order to fully appreciate the invention, the term "transmission channel" used here should not be confused with a "program channel." A "transmission channel" signifies a designated frequency band through which a program data stream containing program material is transmitted. On the other hand, a "program channel" signifies the source of the program material selected by a subscriber to view. For example, a subscriber may select program channel 2 to view program material provided by CBS; program channel 14 to view program material provided by ESPN; program channel 32 to view program material provided by MTV, etc. In this instance, there are K program channels corresponding to the K program data streams.

In accordance with the invention, under control of controller 112, switching unit 104 selects and switches a subset of the K program data streams, say, p program data streams to modulator bank 106, where p≤K. The program data streams in the subset are selected in a manner described below. Each selected program data stream is transmitted through a different transmission channel after it modulates a carrier associated with the transmission channel in a designated forward passband. As is well known, in the United States the designated forward passband for cable TV ranges from 50 MHz to 550 MHz.

Figure 2:
FIG. 2 illustrates selected carriers for transmitting program materials and control messages in a forward passband of the system of FIG. 1.

FIG. 2 illustrates M carriers, $C_1$ through $C_M$, associated with M transmission channels in the forward passband, respectively, which are pre-selected for use in this instance. Since the forward passband is limited in bandwidth, M in this instance represents the maximum number of carriers or transmission channels that the forward passband can accommodate. As shown in FIG. 2, the carrier frequency of $C_1$ is denoted $CF_1$; the carrier frequency of $C_2$ is denoted $CF_2$; ... ; and the carrier frequency of $C_M$ is denoted $CF_M$. In addition, in accordance with the invention, a control carrier CC having a carrier frequency CCF is assigned to carry control messages by controller 112 to the set-top terminals through a control channel in the forward passband.

In prior art, each program channel is fixedly assigned to one of the M carriers for transmission of its program material. In addition, all of the program channels are simultaneously made available to each set-top terminal in a neighborhood. As a result, the number of program channels that a prior art CATV system can provide cannot exceed M. However, the invention overcomes the prior art limitations by dynamically assigning carriers to carry program materials of only those program channels selected by the set-top terminals (or subscribers) in a neighborhood. Advantageously, the number of program channels that the inventive CATV system can provide, although not simultaneously, can exceed M. That is, K can be greater than M in this instance.

Thus, in accordance with the invention, controller 112 communicates to switching unit 104 through link 116, causing unit 104 to switch, to modulator bank 106, the selected p program data streams which contain the program channel materials selected aggregately by the subscribers in the neighborhood. As long as p≤M, which is very likely stemming from the fact that the majority at a given time watch only a few particular favorite program channels, controller 112 manages to assign p carriers to carry the respective data streams. To that end, controller 112 also specifies to unit 104 the selected inputs of modulator bank 106 to which the p data streams are switched.

In this instance, modulator bank 106 includes conventional modulators. Each input to modulator bank 106 is fed to a different modulator for modulating the input onto one of the M carriers. The p data streams are switched by unit 104 to the appropriate inputs of modulator bank 106 to be modulated onto the p assigned carriers, resulting in p data signals representing the modulated carriers, respectively. In addition, controller 112 transmits control messages described below, through link 114, to modulator bank 106 where a modulator modulates the control messages onto the aforementioned control carrier, resulting in a control signal representing the modulated control carrier.

Combiner 108 combines the p data signals and control signal to form a combined signal, which is fed to optical transceiver 110. The latter generates an optical signal representing the combined signal. The optical signal traverses optical fiber 113 to fiber node 122. A transceiver (not shown) in fiber node 122 which performs the inverse function to transceiver 110 converts the optical signal back to the combined signal in electrical form. The combined signal traverses cable distribution network 124 to service area node 126, where the combined signal is multicast to set-top terminals 128-1 through 128-L. A set-top terminal may tune to the control carrier frequency CCF and extract the control signal from the received combined signal. The control signal may contain information identifying the carrier which is assigned to carry the program channel material selected by the set-top terminal. Based on any such information, the set-top terminal tunes to the frequency of the identified carrier and extracts the corresponding data signal from the received combined signal. The selected program channel material is then derived in a well known manner from the extracted data signal for viewing.

Figure 3:
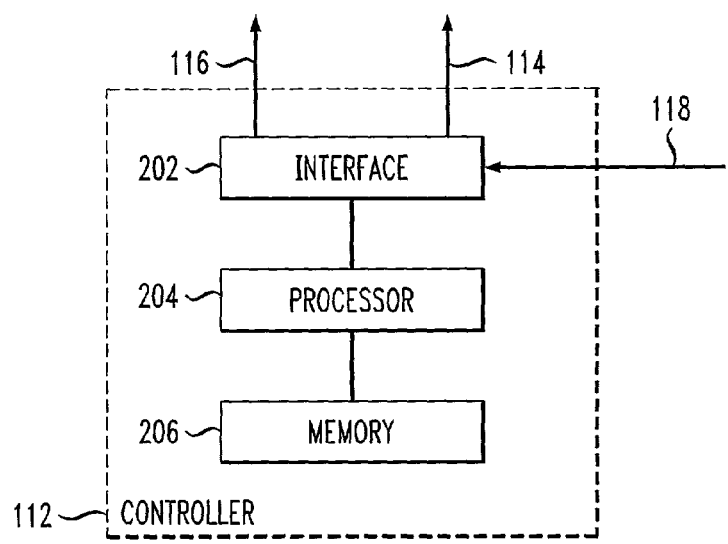
FIG. 3 is a block diagram of a controller used in the system of FIG. 1.

Referring to FIG. 3, controller 112 includes processor 204 of conventional design, which is connected to memory 206 and interface 202. In accordance with the invention, processor 204 receives, from one or more of set-top terminals 128-1 through 128-L, requests for materials of program channels selected thereby. Such requests are processed by processor 204 in accordance with routines stored in memory 206 which are described below. It suffices to know for now that in response to one such request, processor 204 causes switching unit 104 to switch the program data stream corresponding to the requested program channel to a selected input of modulator bank 106 and assigns an unused carrier for transmitting the data stream if processor 204 has not done so. In addition, processor 204 transmits a control message receivable by the requesting set-top terminal, which includes the information identifying the carrier assigned by processor 204 to carry the requested program channel material. As mentioned before, based on such information, the requesting set-top terminal tunes to the frequency of the identified carrier to obtain the selected program channel material.

Figures 4, 5:
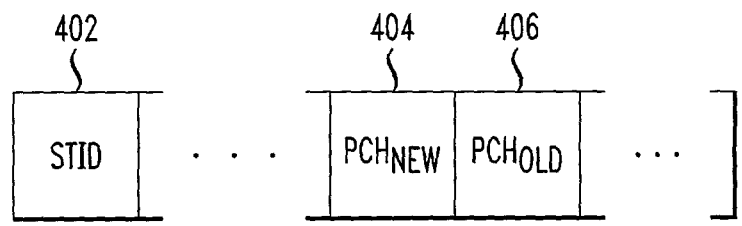
FIG. 4 is a table used by the controller for dynamically assigning the carriers for transmission of program materials in accordance with the invention.
FIG. 5 illustrates a data format of a request processed by the controller.

To manage the dynamic assignment of carriers for transmitting requested program channel materials to each neighborhood, an assignment table is used in this instance which is stored in memory 206. FIG. 4 illustrates such an assignment table (denoted 300), which includes columns 304, 306 and 308. Column 304 enumerates each program channel X selectable by a subscriber through a set-top terminal, which ranges from 1 to K in this instance. Column 306 tracks, for each program channel X, the number of subscribers in the neighborhood selected that program channel to watch ($N_{PCHX}$). Column 308 includes entries identifying the carriers assigned by processor 204 to carry the respective materials of program channels X. Thus, with assignment table 300, processor 204 has knowledge that, for example, referring to row 311, carrier $C_3$ (one of the carriers $C_1$ through $C_M$) is assigned for program channel 2 (X=2) which 12 subscribers ($N_{PCHX}$=12) have selected to watch. In addition, as indicated in row 313, no subscriber ($N_{PCHX}$=0) has selected to watch program channel 1 (X=1). Thus, in accordance with the invention, no carrier (Null) is assigned for program channel 1. That is, program channel 1 material is currently not transmitted to service area node 126 and thus not currently made available in the neighborhood.

When a subscriber at a set-top terminal selects a different program channel to watch, a request for material of the newly-selected program channel is sent from the set-top terminal to controller 118. It should be noted at this point that each of set-top terminals 128-1 through 128-L is pre-assigned with an identifier for identifying the set-top terminal. FIG. 5 illustrates the request which includes, among others, STID field 402 containing an identifier identifying the requesting set-top terminal, $PCH_{NEW}$ field 404 containing the newly-selected program channel number, and $PCH_{OLD}$ field 406 containing the previously-selected program channel number. Thus, for example, if the subscriber changes the program channel selection from channel 8 to channel 2 (or in other words "deselects" channel 8 in favor of channel 2), the value of $PCH_{NEW}$ field 404 would be set to "2" and that of $PCH_{OLD}$ field 406 would be set to "8." If the subscriber has just turned on the cable TV to watch program channel 9, the value of $PCH_{NEW}$ field 404 in that instance would be set to "9" and that of $PCH_{OLD}$ field 406 would be set to "0," indicating an off state. Conversely, if the subscriber who has been watching program channel 9 chooses to turn off the cable TV, the value of $PCH_{NEW}$ field 404 would be set to "0" and that of $PCH_{OLD}$ field 406 would be set to "9."

Referring back to FIG. 1, the above-described request is generated by the requesting set-top terminal, say, terminal 128-1, which incorporates a cable modem for modulating a specified carrier in a reverse passband with the request data. As is well known, in the United States the reverse passband, which ranges from 5 MHz to 42 MHz, is allocated for transmission of signals from set-top terminals to a headend to realize interactive services, e.g., the present inventive cable TV service. The modulated signal from terminal 128-1 representing the request data is fed to service area node 126, from where it is forwarded to fiber node 122 through cable distribution network 124. In fiber node 122, the aforementioned optical transceiver (not shown) generates an optical signal representing the modulated signal. The optical signal traverses optical fiber 115 to optical transceiver 110 in headend 100. Optical transceiver 110 converts the optical signal back to the modulated signal in electrical form. The modulated signal is then demodulated by demodulator 130 to recover the original request, which is fed to controller 112 through link 118. In response to the received request, controller 112 invokes a first routine stored in memory 206.

Figure 6:
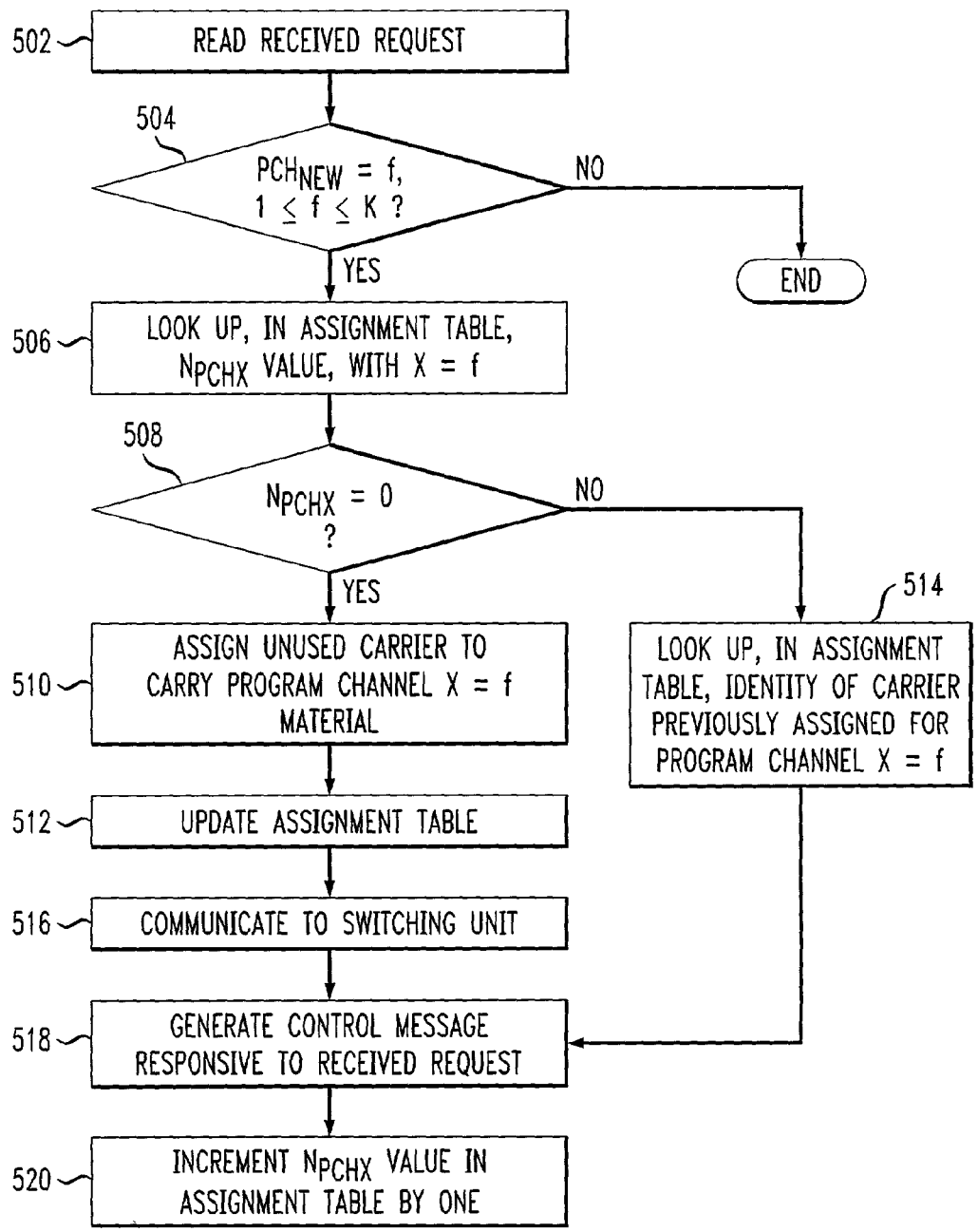
FIG. 6 is a flow chart illustrating a process for processing the request.
Figure 7:
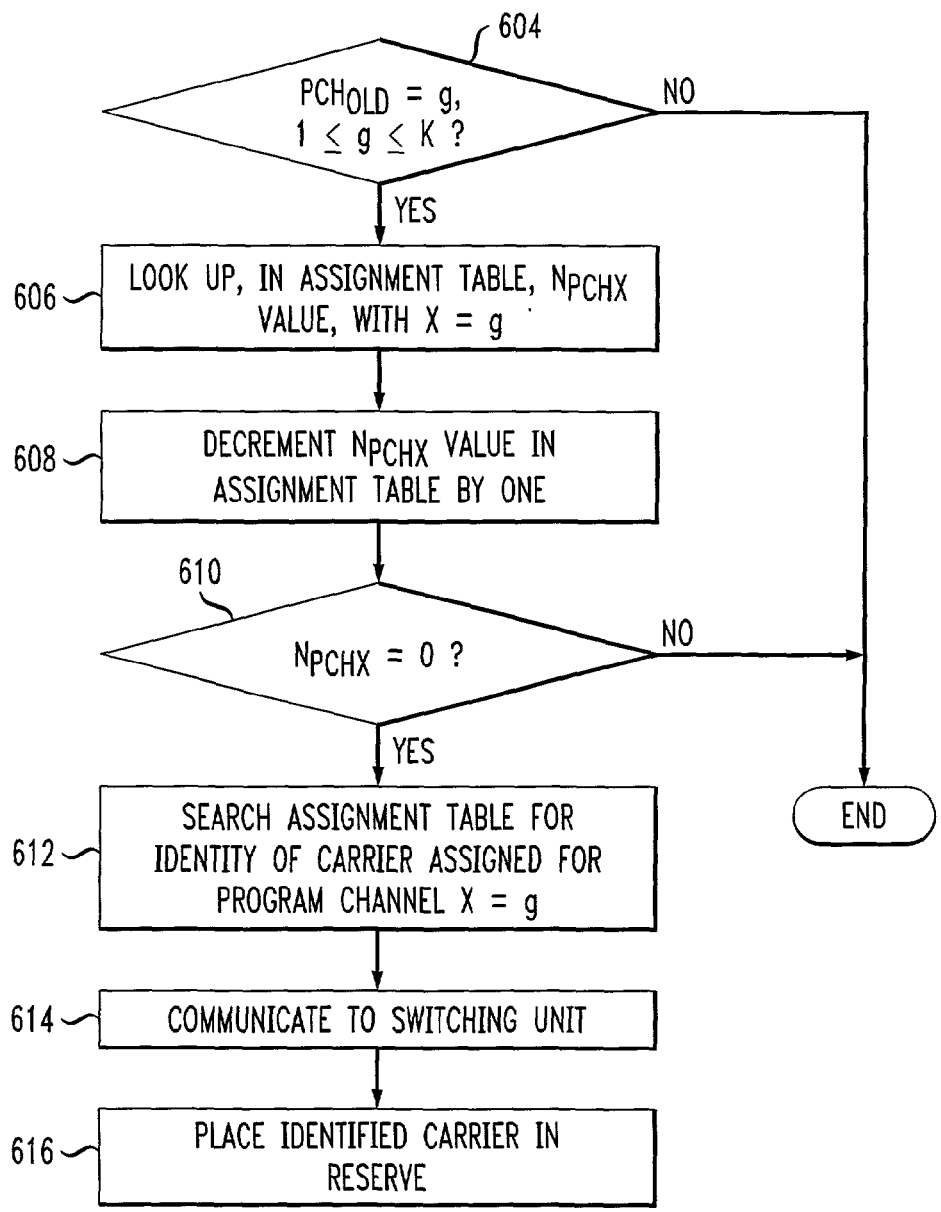
FIG. 7 is a flow chart illustrating a process for retiring an unused carrier.

Instructed by the first routine, processor 204 reads the received request, as indicated at step 502 in FIG. 6. At step 504, processor 204 determines whether $PCH_{NEW}$ field 404 in the request has a nonzero value f, $1 \le f \le K$. If not, i.e., the $PCH_{NEW}$ field value equal to "0" indicating that the subscriber's cable TV has been turned off, the routine comes to an end. Otherwise, processor 204 at step 506 looks up, in assignment table 300, the value of $N_{PCHX}$ with X=f in this case. At step 508, processor 204 determines whether the $N_{PCHX}$ value just looked up equals 0. If $N_{PCHX}$=0, analogous to the previously described situation with respect to row 313 of table 300, no carrier has been assigned to carry the requested program channel material to service area node 126. That is, the requested program material is currently not made available to the neighborhood. In that case, processor 204 at step 510 assigns an unused carrier to carry the requested material of program channel X=f. The new carrier may be selected to avoid as much as possible noise and interference with other carriers being used to optimize the cable TV quality. At step 512, processor 204 updates assignment table 300 to include the identity of the carrier assigned for program channel X=f. Processor 204 at step 516 communicates to switching unit 104, directing it to switch the program data stream associated with program channel X=f to the proper input of modulator bank 106 such that the program channel material is modulated onto the newly-assigned carrier. At step 518, processor 204 generates a control message responsive to the received request, which is to be read by the requesting set-top terminal, terminal 128-1 in this instance. The control message includes, among other information, the STID from the request identifying terminal 128-1 which is the intended recipient of the message, and the identity of the assigned carrier carrying the requested program channel material. The control message is transmitted through the control channel in a manner described before and multicast from service area node 126 to the set-top terminals in the neighborhood. In particular, terminal 128-1 is tuned to the control channel and reads the STID information in the control message, which identifies terminal 128-1 in this instance. Recognizing that it is the intended recipient of the message, terminal 128-1 goes on to read other information in the message including the identity of the assigned carrier carrying its selected program channel material. With the knowledge of the assigned carrier's identity, terminal 128-1 tunes to the frequency of the assigned carrier to receive the selected program channel material.

In any event, the routine proceeds from step 518 to step 520 where processor 204 increments the value of $N_{PCHX}$ with X=f in assignment table 300 by one, reflecting the fact that an additional subscriber (or set-top terminal) in the neighborhood has selected program channel X=f to view. Referring back to step 508, if processor 204 determines that the value of $N_{PCHX}$ with X=f does not equal 0, i.e., at least one set top terminal currently receiving program channel X material carried by a previously assigned carrier, the routine proceeds to step 514. Processor 204 at step 514 looks up, in assignment table 300, the identity of the carrier previously assigned for program channel X=f. The routine then proceeds to step 518 described before.

After the first routine is completed, a second routine is invoked to perform a garbage collection function for retiring any carrier carrying program material which is no longer selected by any set-top terminal in the neighborhood. Instructed by this second routine, processor 204 at step 604 determines whether $PCH_{OLD}$ field 406 in the received request has a nonzero value g, $1 \leq g \leq K$. If not, i.e., the $PCH_{OLD}$ field value equal to "0" indicating that the subscriber's cable TV has just been turned on, the second routine comes to an end. Otherwise, processor 204 at step 606 looks up, in assignment table 300, the value of $N_{PCHX}$ with X=g in this case. At step 608, processor 204 decrements the $N_{PCHX}$ value just looked up by one, reflecting the fact that one fewer subscriber (or set-top terminal) in the neighborhood selected program channel X=g to view. Processor 204 at step 610 determines whether the resulting $N_{PCHX}$ value equals 0. If not, the second routine comes to an end. Otherwise, if $N_{PCHX}=0$, i.e., program channel X=g no longer selected by any subscriber (or set-top terminal) in the neighborhood, the second routine proceeds to step 612. Processor 204 at step 612 searches assignment table 300 for the identity of the carrier assigned for program channel X=g. Processor 204 at step 614 communicates to switching unit 104, causing unit 104 to stop switching the program data stream corresponding to program channel X=g to modulator bank 106, thereby terminating the transmission of the program data stream otherwise carried by the identified carrier. Processor 204 at step 616 places the identified carrier in reserve by substituting the carrier identity entry with "Null" in assignment table 300.

The foregoing merely illustrates the principles of the invention. It will thus be appreciated that those skilled in the art will be able to devise numerous other arrangements which embody the principles of the invention and are thus within its spirit and scope.

For example, in the disclosed embodiment, system 10 is illustratively used to serve a single neighborhood. However, in another embodiment of the invention, system 10 is similarly used to serve multiple neighborhoods.

In addition, based on the disclosure heretofore, it is apparent that system 10 can readily accommodate what is known in the art as a picture-in-picture (PIP) feature providing simultaneous viewing of multiple program channels. In that case, a set-top terminal supporting the PIP feature requests materials of multiple program channels and simultaneously tunes to the assigned carriers carrying the requested program materials.

Further, in the event that the carriers in CATV system 10 are oversubscribed, i.e., no available carrier can be assigned by controller 112 to carry new program material requested by a set-top terminal in the neighborhood, "blocking" may be implemented such that the requesting set-top terminal is temporarily denied access to the new program material. However, the requesting set-top terminal may be instructed by controller 112 to tune in the meantime to a pre-set channel reserved for the blocking purposes. For example, this pre-set channel may carry commercials, infomercials, coming movie attractions, etc., in addition to a stand-by notice informing the subscriber of the unavailability of the requested program material. Alternatively, controller 112 may transmit a text message including the stand-by notice to the requesting set-top terminal to be shown to the subscriber. In either event, as soon as a carrier becomes available, controller 112 transmits another notice to the requesting set-top terminal to inform the subscriber of the availability of the requested program material, followed by a control message identifying the carrier newly assigned to carry such material. In response to this control message, the set-top terminal tunes to the frequency of the identified carrier to obtain the requested program material.

Moreover, the request of FIG. 5 may automatically be generated by a set-top terminal to deselect a program channel as soon as an event on the program channel such as a movie is over. For example, by setting a time-out clock in the headend or set top terminal to track the play time of the event, the request, with $PCH_{NEW}=0$, is transmitted as soon as the time-out period corresponding to the length of the event or a fixed time expires. If no other set-top terminals in the same neighborhood tune to the frequency of the carrier assigned for the program channel, the assigned carrier will be retired in accordance with the invention. Thus, at an event boundary, a program channel may be deselected based on a fixed or variable time-out period.

The request for deselecting a program channel may also be automatically generated by a set-top terminal in response to a lack of an audience. For example, the set-top terminal may incorporate detection technologies such as motion detectors, acoustic sensors and/or infrared sensors, which are used to detect presence of any viewers in front of the set-top terminal by their movement, voice and/or body heat. If it is determined that no viewer is present, the request for deselecting the program channel is automatically generated by the set-top terminal.

Finally, system 10 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors such as digital signal processors (DSPs). Thus, for example, switching unit 104 and modulator bank 106 in system 10 may be realized by one or more DSPs. A DSP typically comprises a combination of digital logic devices and other components, which may be a state machine or implemented with a dedicated microprocessor or micro-controller running a software program or having functions programmed in firmware.

What is claimed is:

1. Apparatus for use at a service node of a content delivery network, said apparatus configured to controllably provide a collection of program materials to a group of terminals serviced thereby, said group of terminals each being configured to receive said collection of program materials modulated on a plurality of carriers by said service node, said apparatus comprising:
- an interface configured to receive a request for a selected program material from at least one terminal, said request comprising an identification associated with said at least one terminal;
- a processing element configured to responsive to said received request determine whether said selected program material is included in said collection of program materials currently being provided to said group of terminals serviced by said service node apparatus;
- a first control element configured to, when it is determined that said selected program material is not included in said collection of program materials:
  - add said selected program material to said collection of program materials currently provided to at least one of said group of terminals by said service node apparatus; and
  - send a control message to said at least one terminal, said control message comprising an identification field which includes said identification associated with said at least one terminal, and an indication of a carrier associated with said selected program material; and
- a second control element configured to, when it is determined that said selected program material is already included in said collection of program materials:
  - send said control message to said at least one terminal, said control message comprising said identification field which includes said identification associated with said at least one terminal, and said indication of said carrier associated with said selected program material;
- when it is determined that said selected program material is no longer selected by any of said group of terminals, remove said selected program material from said collection of program materials; and
- after a pre-set length of time, automatically remove said selected program material from said collection of program materials.

2. The apparatus of claim 1, wherein said carrier comprises a selected carrier different than said plurality of carriers being assigned to carry said selected program material when it is determined that said selected program material is not included in said collection of program materials currently being provided.

3. The apparatus of claim 2, wherein an identity of said selected carrier is communicated to said at least one terminal via said control message.

4. The apparatus of claim 2, wherein said selected carrier is associated with a transmission channel through which said selected program material is provided.

5. The apparatus of claim 1, wherein each program material in said collection is associated with a respective one of program channels selectable by said terminals in said group.

6. The apparatus of claim 1, wherein said request comprises:
- an identification associated with said at least one terminal;
- a first channel identity field to identify a programming channel being requested; and
- a second channel identity field to identify a previously selected programming channel being viewed at said at least one terminal.

7. The apparatus of claim 6, wherein said processing element is further configured to decrement a value corresponding to said previously selected programming channel.

8. The apparatus of claim 6, wherein said processing element is further configured to increment a value corresponding to said new programming channel.

9. The apparatus of claim 6, wherein said second channel identity field is set to a null value when said at least one terminal is first activated, said null value indicating that no previously selected programming channel exists.

10. The apparatus of claim 6, wherein said first channel identity field is set to a null value when said terminal is deactivated, said null value indicating that no new programming channel request exists.

11. A method for use in a content delivery network for controllably providing a collection of program materials to a group of terminals via a processing entity at a service node entity of said network, said group of terminals each being configured to receive said collection of program materials modulated on a plurality of carriers by said service node entity, said method comprising:
- receiving a request for selected program material from a requesting terminal at said service node entity;
- in response to said received request, said service node entity determining whether said selected program material is included in said collection of program materials currently broadcast;
- when it is determined that said selected program material is not included in said collection of program materials currently broadcast, said service node entity causing said selected program material to be dynamically added to said collection of program materials currently broadcast to at least one of said group of terminals, and sending a control message to said requesting terminal, said control message configured to identify to said requesting terminal a channel upon which said selected program material will be broadcast;
- when it is determined that said selected program material is already included in said collection of program materials that are currently broadcast, sending a control message to said requesting terminal, said control message configured to identify to said requesting terminal said channel upon which said selected program material is already broadcast; and
- said service node entity automatically causing, at a program boundary, said selected program material to be removed from said collection of program materials currently broadcast via said service node entity.

12. The method of claim 11, wherein said channel comprises a selected carrier different than said plurality of carriers being assigned to carry said selected program material when it is determined that said selected program material is not included in said collection of program materials.

13. The method of claim 12, wherein said selected carrier is associated with a transmission channel through which said selected program material is provided.

14. The method of claim 11, wherein each program material in said collection is associated with a respective one of program channels selectable by said terminals in said group.

15. The method of claim 11, wherein said act of receiving said request comprises receiving:
- an identification field to identify a terminal initiating said request;
- a first channel identity field to identify a programming channel being requested; and
- a second channel identity field to identify a previously selected programming channel being viewed at said terminal.

16. The method of claim 15, wherein said act of determining comprises decrementing a value corresponding to said previously selected programming channel.

17. The method of claim 16, wherein said act of determining comprises incrementing a value corresponding to said new programming channel.

18. The method of claim 15, further comprising:
activating said at least one terminal; and
setting second channel identity field to a null value, said null value indicating that no previously selected programming channel selection exists.

19. The method of claim 15, further comprising:
deactivating said at least one terminal; and
setting first channel identity field to a null value, said null value indicating that no new request for a programming channel exists.

20. The method of claim 11, wherein said act of automatically causing said selected program material to be removed from said collection of program materials currently broadcast at a program boundary occurs only when no requests for said program material exist.

21. In a content delivery network for providing a plurality of programming channels to a group of terminals serviced via a service node apparatus, said group of terminals each being configured to receive said plurality of programming channels modulated on a plurality of carriers by said service node apparatus, a method of operating said service node apparatus, said method comprising:
receiving at said service node apparatus a request for a selected program channel from said requesting terminal;
responsive to said request, said service node apparatus determining whether said selected program channel is included in said plurality of program channels currently being delivered;
causing said selected program channel to be dynamically assigned for delivery via a carrier assigned to carry said selected program channel when said selected program channel is not included in said collection of program channels;
otherwise, when said selected program channel is already included in said plurality of program channels, determining said carrier assigned to carry said selected program channel;
transmitting a control message to said requesting terminal, said control message identifying said requesting terminal as an intended recipient of said control message and said carrier assigned to carry said selected program channel;
receiving at said service node apparatus an indication that said requesting terminal is no longer viewing any of said plurality of program channels;
in response to receiving said indication, causing said stream associated with delivery of said selected program channel in said collection of program channels to be reclaimed by causing said selected program channel to be removed from assigned delivery; and
at a program boundary causing said stream associated with delivery of said selected program channel in said collection of program channels to be reclaimed by causing said selected program channel to be removed from assigned delivery.

22. The method of claim 21, further comprising broadcasting said control message to said group of terminals.

23. The method of claim 22, wherein said group of terminals are associated with a single node of said network.

24. The method of claim 21, further comprising:
determining whether a transmission channel is available for transmitting said selected programming channel; and
generating a standby message to said requesting terminal when said transmission channel is not available.

25. The method of claim 24, further comprising:
waiting for said transmission channel to become available; and
notifying said requesting terminal when said transmission channel becomes available.

26. The method of claim 21, wherein said act of causing said selected program channel to be dynamically assigned comprises selecting one or more carriers that will minimize interference with one or more of said program materials currently being broadcast.

27. The method of claim 21, wherein said indication that said requesting terminal has terminated viewing any of said plurality of program channels comprises an indication that no viewer is present at said terminal.

28. The method of claim 27, wherein said indication that no viewer is present at said terminal is determined by utilizing at least one of a motion detector, an acoustic sensor, or an infrared sensor.

29. The method of claim 21, wherein said indication that said requesting terminal has terminated viewing any of said plurality of program channels comprises an indication that said terminal has been turned off.

30. Apparatus for use at a service node of a content delivery network, said apparatus configured to controllably provide a collection of program materials to a group of terminals serviced thereby, said group of terminals each being configured to receive said collection of program materials modulated on a plurality of carriers by said service node, said apparatus comprising:
an interface configured to receive a request for a selected program material from at least one terminal;
a processing element responsive to said received request configured to determine whether said selected program material is included in said collection of program materials currently being provided to said group of terminals serviced by said service node apparatus; and
a control element configured to:
when it is determined that said selected program material is not included in said collection of program materials:
add said selected program material to said collection of program materials currently provided to at least one of said group of terminals by said service node apparatus; and
send a control message to said at least one terminal, said control message comprising an indication of a carrier associated with said selected program material; and
when it is determined that said selected program material is already included in said collection of program materials send said control message to said at least one terminal, said control message comprising said indication of said carrier associated with said selected program material.

31. The apparatus of claim 30, wherein said control element is further configured to, when it is determined that said selected program material is not included in said collection of program materials and said selected program material cannot be added to said collection of program materials, send said control message to said at least one terminal, said control message comprising said indication of a pre-set carrier associated with a pre-set program material.

32. The apparatus of claim 31, wherein said pre-set program material comprises one or more of: commercials, infomercials, coming movie attractions, and a stand-by notice.

33. The apparatus of claim 32, wherein said control element is further configured to:
when it is determined that said selected program material can be added, send said control message to said at least one terminal, send said control message to said at least one terminal, said control message comprising said indication of said carrier associated with said selected program material.

34. The apparatus of claim 30, wherein said processing element is further configured to, when it is determined that said selected program material is no longer selected by any of said group of terminals, remove said selected program material from said collection of program materials.

35. The apparatus of claim 30, wherein said processing element is further configured to automatically remove, after a pre-set length of time, said selected program material from said collection of program materials.

36. The apparatus of claim 30, wherein said carrier comprises a selected carrier different than said plurality of carriers assigned to carry said selected program material when it is determined that said selected program material is not included in said collection of program materials currently provided.

37. The apparatus of claim 36, wherein an identity of said selected carrier is communicated to said at least one terminal via said control message.

38. The apparatus of claim 36, wherein said selected carrier is associated with a transmission channel through which said selected program material is provided.

39. The apparatus of claim 30, wherein each program material in said collection is associated with a respective one of program channels selectable by said terminals in said group.

40. A method for use in a content delivery network for controllably providing a collection of program materials to a group of terminals via a processing entity at a service node entity of said network, said group of terminals each being configured to receive said collection of program materials modulated on a plurality of carriers by said service node entity, said method comprising:
receiving a request for selected program material from a requesting terminal at said service node entity;
in response to said received request, said service node entity determining whether or not said selected program material is included in said collection of program materials currently broadcast;
when it is determined that said selected program material is not included in said collection of program materials currently broadcast:
said service node entity causing said selected program material to be dynamically added to said collection of program materials currently broadcast to at least one of said group of terminals; and
sending a control message to said requesting terminal, said control message configured to identify to said requesting terminal a channel upon which said selected program material will be broadcast; or
when it is determined that said selected program material is already included in said collection of program materials that are currently broadcast sending a control message to said requesting terminal, said control message configured to identify to said requesting terminal said channel upon which said selected program material is already broadcast.

41. The method of claim 40, further comprising receiving at said service node apparatus an indication that said requesting terminal is no longer viewing any of said plurality of program channels; and
in response to receiving said indication, causing said stream associated with delivery of said selected program channel in said collection of program channels to be reclaimed by causing said selected program channel to be removed from assigned delivery.

42. The method of claim 40, further comprising causing reclamation of, at a program boundary, said stream associated with delivery of said selected program channel in said collection of program channels, said reclamation comprising said selected program channel being removed from assigned delivery.

43. The method of claim 40, further comprising:
determining whether a transmission channel is available for transmitting said selected programming channel; and
generating a standby message to said requesting terminal when said transmission channel is not available.

44. In a content delivery network for providing a plurality of programming channels to a group of terminals serviced via a service node apparatus, said group of terminals each being configured to receive said plurality of programming channels modulated on a plurality of carriers by said service node apparatus, a method of operating said service node apparatus, said method comprising:
receiving at said service node apparatus a request for a selected program channel from said requesting terminal;
responsive to said request, said service node apparatus determining whether said selected program channel is included in said plurality of program channels currently being delivered;
implementing logic, said logic comprising:
causing said selected program channel to be dynamically assigned for delivery via a carrier assigned to carry said selected program channel when said selected program channel is not included in said collection of program channels;
otherwise, when said selected program channel is already included in said plurality of program channels, determining said carrier assigned to carry said selected program channel; and
transmitting a control message to said requesting terminal, said control message identifying said carrier assigned to carry said selected program channel.

45. The method of claim 44, further comprising said service node apparatus determining that said selected program material cannot be added to said collection of program materials; and
based at least on said determination, transmitting said control message to said requesting terminal, said control message identifying a pre-set carrier associated with a pre-set program material.

46. The method of claim 45, wherein said pre-set program material comprises one or more of: commercials, infomercials, coming movie attractions, and a stand-by notice.

47. The method of claim 45, further comprising when said selected program material can be added, transmitting a control message to said requesting terminal, said control message identifying said carrier assigned to carry said selected program channel.

48. The method of claim 44, further comprising receiving at said service node apparatus an indication that said requesting terminal is no longer viewing any of said plurality of program channels; and
based at least on said indication, causing said stream associated with delivery of said selected program channel in said collection of program channels to be reclaimed by causing said selected program channel to be removed from assigned delivery.

49. The method of claim 44, further comprising, at a program boundary, causing said stream associated with delivery of said selected program channel in said collection of program channels to be reclaimed by causing said selected program channel to be removed from assigned delivery.

\* \* \* \* \*